US011908604B2

(12) United States Patent
Nanbara et al.

(10) Patent No.: US 11,908,604 B2
(45) Date of Patent: Feb. 20, 2024

(54) COMPOSITE MATERIAL MOLDED ARTICLE, REACTOR, COMPRISING A ROUGHENED SURFACE

(71) Applicants: AutoNetworks Technologies, Ltd., Mie (JP); Sumitomo Wiring Systems, Ltd., Mie (JP); SUMITOMO ELECTRIC INDUSTRIES, LTD., Osaka (JP)

(72) Inventors: Shintaro Nanbara, Mie (JP); Takashi Takada, Mie (JP); Kazushi Kusawake, Mie (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 1319 days.

(21) Appl. No.: 15/781,567

(22) PCT Filed: Dec. 12, 2016

(86) PCT No.: PCT/JP2016/086949
§ 371 (c)(1),
(2) Date: Jun. 5, 2018

(87) PCT Pub. No.: WO2017/110567
PCT Pub. Date: Jun. 29, 2017

(65) Prior Publication Data
US 2019/0259524 A1 Aug. 22, 2019

(30) Foreign Application Priority Data
Dec. 24, 2015 (JP) .............................. JP2015-251631

(51) Int. Cl.
*H01F 1/00* (2006.01)
*H01F 27/255* (2006.01)
*H01F 41/063* (2016.01)
*H01F 1/20* (2006.01)
(Continued)

(52) U.S. Cl.
CPC ............ *H01F 27/255* (2013.01); *C08K 3/34* (2013.01); *H01F 1/20* (2013.01); *H01F 3/08* (2013.01);
(Continued)

(58) Field of Classification Search
CPC ..................................... H01F 1/00; H01F 1/01
See application file for complete search history.

(56) References Cited

U.S. PATENT DOCUMENTS

2013/0135072 A1* 5/2013 Inaba ...................... H01F 27/23
336/90
2013/0147291 A1* 6/2013 Woolmer ............... H02K 5/203
310/58

(Continued)

FOREIGN PATENT DOCUMENTS

JP H07-048605 A 2/1995
JP 10-294024 A * 11/1998
(Continued)

OTHER PUBLICATIONS

Solvay, Technical Data Sheet, Amodel AT-6130 HS, polyphthalamide (Year: 2014).*
Ides Prospector, Genestar GW2458HF Polyamide 9T (Year: 2010).*
Translation of JP 10-294024 (Year: 1998).*
Search Report for PCT/JP2016/086949, dated Feb. 21, 2017.

*Primary Examiner* — Hoa (Holly) Le
(74) *Attorney, Agent, or Firm* — Honigman LLP (57) ABSTRACT

Provided is a composite material molded article including soft magnetic powder and resin containing the soft magnetic powder in a dispersed state. The composite material molded article is provided with a roughened region having an arithmetic average roughness Ra of 3.0 μm or more on at least a portion of its surfaces.

10 Claims, 3 Drawing Sheets

(51) Int. Cl.
*H01F 3/08* (2006.01)
*H01F 3/10* (2006.01)
*H01F 27/28* (2006.01)
*H01F 27/26* (2006.01)
*H01F 41/02* (2006.01)
*H01F 37/00* (2006.01)
*C08K 3/34* (2006.01)

(52) U.S. Cl.
CPC ............ *H01F 3/10* (2013.01); *H01F 27/263* (2013.01); *H01F 27/2823* (2013.01); *H01F 37/00* (2013.01); *H01F 41/0246* (2013.01); *H01F 41/063* (2016.01)

(56) References Cited

U.S. PATENT DOCUMENTS

| | | |
|---|---|---|
| 2014/0338185 A1 | 11/2014 | Muneuchi et al. |
| 2015/0179323 A1* | 6/2015 | Uemoto .............. H01F 17/04 336/221 |
| 2017/0040100 A1 | 2/2017 | Hirabayashi et al. |
| 2017/0110233 A1 | 4/2017 | Sakai et al. |

FOREIGN PATENT DOCUMENTS

| | | |
|---|---|---|
| JP | 2013-211371 A | 10/2013 |
| JP | 2016-225441 A | 12/2016 |

* cited by examiner

COMPOSITE MATERIAL MOLDED ARTICLE, REACTOR, COMPRISING A ROUGHENED SURFACE

CROSS-REFERENCE TO RELATED APPLICATIONS

This application is the U.S. national stage of PCT/JP2016/086949 filed Dec. 12, 2016, which claims priority of Japanese Patent Application No. 2015-251631 filed on Dec. 24, 2015, which is incorporated herein by reference in its entirety.

FIELD OF THE INVENTION

The present description relates to a composite material molded article, a reactor, and a method for manufacturing a composite material molded article.

BACKGROUND OF THE INVENTION

A reactor is one of the parts used in a circuit that boosts/lowers a voltage. Reactors are used in converters to be mounted in vehicles such as hybrid cars. The reactor disclosed in JP 2013-118352A is an example of such reactors.

The reactor disclosed in JP 2013-118352A includes a coil having a pair of coil elements (wound portions), and a magnetic core having a pair of inner core portions arranged inside the coil and a pair of outer core portions that connect the end surfaces of the two inner core portions (paragraphs 0105 to 0116 in the specification). The coil and the pair of inner core portions are integrally held using resin molded portions. The inner core portions and the outer core portions are made of a composite material (composite material molded article) containing magnetic powder and resin. The composite material is manufactured by filling a mold with a mixture of magnetic powder and melted resin and solidifying (curing) the resin.

SUMMARY OF THE INVENTION

The composite material molded article of the present disclosure is a composite material molded article including: soft magnetic powder; and resin containing the soft magnetic powder in a dispersed state, wherein a roughened region having an arithmetic average roughness Ra of 3.0 μm or more is provided on at least a portion of surfaces.

The reactor of the present disclosure is a reactor including: a coil obtained by winding a winding wire; and a magnetic core around which the coil is arranged, wherein at least a portion of the magnetic core includes the above-mentioned composite material molded article of the present disclosure.

The method for manufacturing a composite material molded article of the present disclosure is a method for manufacturing a composite material molded article that includes: a step of injecting a mixture containing soft magnetic powder and melted resin into a mold and solidifying the resin to mold a composite material molded article, wherein a difference Tr−Td between a temperature Tr of the melted resin and a temperature Td of the mold is 200° C. or higher.

DETAILED DESCRIPTION OF THE PREFERRED EMBODIMENTS

There is demand for the improvement of the adhesion (joining properties) between the composite material molded article, which is a part of the magnetic core, and other constituent members such as the above-mentioned resin molded portion.

The coil does not generate heat when no electric current flows, and the coil becomes hot due to Joule's heat when an electric current flows. The magnetic core and other constituent members such as the resin molded portion that contain resin and that are in contact with the magnetic core are arranged near the coil, and thus thermally expand and contract in response to a heat cycle caused by the coil. When the flowing current value is large, for example, as with reactors used in vehicle-mounted converters, the coil generates a large amount of heat, and therefore, the above-mentioned magnetic core and other constituent members thermally expand and contract significantly. In general, the thermal expansion coefficients of the other constituents are different from that of the magnetic core, and therefore, there is a risk that thermal expansion and contraction will cause separation of the other constituents from the magnetic core. There is a risk that the separation of the other constituent members will cause deterioration of insulation at the position where the separation has occurred, and thus vibration and noise will increase compared with the case prior to the separation.

Therefore, an object of the present description is to provide a composite material molded article that can be used to form a magnetic core having good adhesion (joining properties) to other constituent members such as resin members.

In addition, another object of the present description is to provide a reactor including the above-mentioned composite material molded article.

Furthermore, yet another object of the present description is to provide a method for manufacturing a composite material molded article that is used to manufacture the above-mentioned composite material molded article.

The composite material molded article of the present disclosure can be used to form a magnetic core having good adhesion (joining properties) to the other constituent members.

With the reactor of the present disclosure, good adhesion (joining properties) between the magnetic core and the other constituent members is achieved.

The method for manufacturing a composite material molded article of the present disclosure can be used to manufacture the above-mentioned composite material molded First, embodiments of the present description will be listed and described.

(1) A composite material molded article according to an aspect of the present description is a composite material molded article including: soft magnetic powder; and resin containing the soft magnetic powder in a dispersed state, wherein a roughened region having an arithmetic average roughness Ra of 3.0 μm or more is provided on at least a portion of surfaces.

With the above-mentioned configuration, the roughened region is provided, and a favorable anchor effect can be thus obtained. Therefore, this composite material molded article can be used to form a magnetic core having good adhesion (joining properties) to other constituent members. Specifically, when this composite material molded article is used in a magnetic core of a reactor, a reactor in which good adhesion (joining properties) between the magnetic core and the other constituent members is achieved is obtained. Although details will be described later, examples of the other constituent members include an adhesive that is used to bond cores to each other or to bond cores to a gap material provided between the cores, a resin molded portion that covers the surface of the magnetic core, and a sealing resin portion that seals the coil and the magnetic core inside a case. Accordingly, the deterioration of insulation and the increases in vibration and noise can be suppressed.

(2) In an embodiment of the above-mentioned composite material molded article, a peripheral surface includes surfaces along a circumferential direction of a magnetic flux excited in the composite material molded article among surfaces of the composite material molded article, and the roughened region is formed on the peripheral surface.

With the above-mentioned configuration, the adhesion (joining properties) between the peripheral surface of the composite material molded article and the other constituent members that are in contact with the peripheral surface can be improved. Therefore, when this composite material molded article is used in a magnetic core of a reactor, the adhesion to the other constituent members (e.g., a resin molded portion and a sealing resin portion) that are in contact with the peripheral surface of the magnetic core can be improved. In particular, when this composite material molded article is used in an inner core portion of the magnetic core that is arranged inside the coil, the adhesion between the peripheral surface of the inner core portion and other constituent members (e.g., a resin molded portion and a sealing resin portion) that are provided between the peripheral surface of the inner core portion and the inner peripheral surface of the coil can be improved, and therefore, the insulation between the coil and the inner core portion can be easily improved, thus making it possible to suppress the increases in vibration and noise.

(3) In an embodiment of the above-mentioned composite material molded article, an interlinkage surface is a surface that intersects a magnetic flux excited in the composite material molded article among surfaces of the composite material molded article, and the roughened region is formed on the interlinkage surface.

With the above-mentioned configuration, the adhesion (joining properties) between the interlinkage surface of the composite material molded article and the other constituent members that are in contact with the interlinkage surface can be improved. Therefore, when this composite material molded article is used in a magnetic core including a plurality of core members, the adhesion (joining properties) to the other constituent members (e.g., an adhesive, a resin molded portion, and a sealing resin portion) that are provided between the core members can be improved.

(4) In an embodiment of the above-mentioned composite material molded article, the soft magnetic powder contains soft magnetic particles made of an Fe-based alloy that contains Si in an amount of 1.0 mass % or more and 8.0 mass % or less.

The Fe-based alloy containing Si in an amount of 1.0 mass % or more has a high electric resistivity and makes it easy to reduce eddy current loss. In addition, such an Fe-based alloy is harder than pure iron. Therefore, distortion is less likely to occur during a manufacturing process, and hysteresis loss is thus easily reduced, thus making it possible to further reduce iron loss. Regarding the Fe-based alloy containing Si in an amount of 8.0 mass % or less, the amount of Si is not excessively large, and both low loss and high saturation magnetization are easily achieved.

(5) In an embodiment of the above-mentioned composite material molded article, the soft magnetic powder is contained in the composite material molded article in an amount of 30 vol % or more and 80 vol % or less with respect to the entirety of the composite material molded article.

When the above-mentioned content is 30 vol % or more, the ratio of the magnetic component is sufficiently high, that is, the ratio of the resin component is low, and therefore, the shape of the soft magnetic powder easily appears on the surfaces of the composite material molded article, thus making it easy to form the roughened region on the surfaces. In addition, the ratio of the magnetic component is sufficiently high, and therefore, when this composite material molded article is used to form a reactor, saturation magnetization is easily improved. When the above-mentioned content is 80 vol % or less, the ratio of the magnetic component is not excessively high, and therefore, the insulation between the soft magnetic particles can be improved, thus making it possible to reduce eddy current loss.

(6) In an embodiment of the above-mentioned composite material molded article, the soft magnetic powder has an average particle diameter of 5 μm or more and 300 μm or less.

When the soft magnetic powder has an average particle diameter of 5 μm or more, the soft magnetic powder is less likely to coagulate, and resin is easily provided between the powder particles, thus making it easy to reduce eddy current loss. When the soft magnetic powder has an average particle diameter of 300 μm or less, the size of the soft magnetic powder is not excessively large, thus making it easy to form the roughened region on the surfaces of the composite material molded article. Moreover, eddy current loss of the powder particles can be reduced, and eddy current loss of the composite material molded article can be thus reduced. In addition, the filling rate can be improved, and the saturation magnetization of the composite material molded article is easily improved.

(7) A reactor according to an aspect of the present description is a reactor including: a coil obtained by winding a winding wire; and a magnetic core around which the coil is arranged, wherein at least a portion of the magnetic core includes the composite material molded article according to any one of the items (1) to (6).

With the above-mentioned configuration, the magnetic core includes the above-mentioned composite material molded article, and therefore, good adhesion (joining properties) between the magnetic core and the other constituent members is achieved. Accordingly, vibration and noise caused by the separation of the other constituent members from the magnetic core can be reduced.

(8) A method for manufacturing a composite material molded article according to an aspect of the present description is a method for manufacturing a composite material molded article that includes: a step of injecting a mixture containing soft magnetic powder and melted resin into a mold and solidifying the resin to mold a composite material molded article, wherein a difference Tr−Td between a temperature Tr of the melted resin and a temperature Td of the mold is 200° C. or higher.

With the above-mentioned configuration, a composite material molded article provided with a roughened region 5 having an arithmetic average roughness Ra of 3.0 μm or more can be manufactured. It is thought that this is caused by the difference between the thermal expansion rates of the soft magnetic powder and the resin. In general, the thermal expansion rate of the resin is larger than that of the soft magnetic powder, and therefore, the contraction degree of the resin is larger than that of the soft magnetic powder during cooling. In the case where the above-mentioned temperature difference Tr−Td is large, when the surface of the mixture is rapidly cooled, the difference between the contraction degrees of the resin and the soft magnetic powder on the surface side increases compared with the case where the temperature difference is small. Therefore, the surface roughness of the composite material molded article is easily increased.

(9) In an embodiment of the above-mentioned method for manufacturing a composite material molded article, the temperature Td of the mold is 100° C. or lower.

When Td≤100° C., the condition that 200° C.≤Tr−Td is easily satisfied without an excessive rise in the temperature Tr of the resin. The fluidity of the mixture is ensured, and the temperature Tr of the resin does not excessively rise, thus making it easy to suppress the promotion of the thermal decomposition of the resin and the deterioration of the physical properties, such as strength, of the composite material molded article. In addition, it is easy to suppress yellowing of the surfaces of the composite material molded article.

(10) In an embodiment of the above-mentioned method for manufacturing a composite material molded article, the temperature Td of the mold is lower than or equal to a glass transition point Tg of the resin.

When Td≤Tg, the temperature Td of the mold is easily lowered, and thus the condition that 200° C.≤Tr−Td is easily satisfied without an excessive rise in the temperature Tr of the resin.

(11) In an embodiment of the above-mentioned method for manufacturing a composite material molded article, the resin is polyphenylene sulfide resin, and the temperature Td of the mold is higher than or equal to a temperature that is 10° C. lower than a glass transition point Tg of the resin, and is lower than or equal to a temperature that is 10° C. higher than a glass transition point Tg of the resin.

When the resin is polyphenylene sulfide resin, and Tg−10° C.≤Td, the temperature Td of the mold is less likely to be excessively low. Therefore, the solidification speed of the resin is not excessively high, thus making it easy to suppress the occurrence of cracks inside the composite material molded article.

When Td≤Tg+10° C., the temperature Td of the mold is less likely to be excessively high, and thus the condition that 200° C.≤Tr−Td is easily satisfied without an excessive rise in the temperature Tr of the resin. Moreover, the solidification speed is not excessively low, thus making it easy to improve the mold release property.

(12) In an embodiment of the above-mentioned method for manufacturing a composite material molded article, the resin is polyamide 9T resin, and the temperature Td of the mold is higher than or equal to a temperature that is 45° C. lower than a glass transition point Tg of the resin.

When the resin is polyamide 9T resin, and Tg−45° C.≤Td, the temperature Td of the mold is less likely to be excessively low. Therefore, the solidification speed of the resin is not excessively high, thus making it easy to suppress the occurrence of cracks inside the composite material molded article.

(13) In an embodiment of the above-mentioned method for manufacturing a composite material molded article, the temperature Td of the mold is lower than or equal to a temperature that is 135° C. lower than a melting point Tm of the resin.

When Td≤Tm−135° C., the temperature Td of the mold is easily lowered, and thus the condition that 200° C.≤Tr−Td is easily satisfied without an excessive rise in the temperature Tr of the resin.

Hereinafter, details of embodiments of the present description will be described with reference to the drawings.

Embodiment 1

Composite Material Molded Article

A composite material molded article 10 according to Embodiment 1 will be described with reference to FIG. 1. The composite material molded article 10 includes soft magnetic powder and resin containing the soft magnetic powder in a dispersed state, and typically constitutes at least a portion of a magnetic core 3 provided in a reactor 1. Although details will be specifically described later, the reactor 1 includes a coil 2 and a magnetic core 3 shown in FIG. 1, for example. In this specification, the coil 2 is obtained by connecting in parallel a pair of wound portions 2a and 2b that are each obtained by spirally winding a winding wire 2w. The magnetic core 3 is configured to have an annular shape by combining two core members 30 having the same shape. Both of the core members 30 are made of the composite material molded article 10. One feature of the composite material molded article 10 is that a roughened region with a surface having a high surface roughness is provided. Hereinafter, details will be described. In this specification, a reactor 1 is formed by assembling the core members 30 in the coil 2, and when the reactor 1 is installed on an installation target such as a cooling base, the installation target side is referred to as "lower side", and a side opposite to the installation target is referred to as "upper side" in the following description. In the figures, components having the same name are denoted by the same reference numeral.

Overall Configuration

The composite material molded article 10 includes a pair of inner core portions 11, and an outer core portion 12 that connects the ends on one side of the inner core portions 11. The composite material molded article 10 is substantially U-shaped, as viewed from above. The pair of inner core portions 11 are respectively arranged inside the pair of wound portions 2a and 2b when the core member 30 including the composite material molded article 10 is assembled in the coil 2 (FIG. 1). The outer core portion 12 protrudes from the end of the coil 2 when the core member 30 including the composite material molded article 10 is assembled in the coil 2 in the same manner. Upper surfaces 11U of the inner core portions 11 are substantially flush with an upper surface 12u of the outer core portion 12. On the other hand, the size of the outer core portion 12 is adjusted such that a lower surface 12d of the outer core portion 12 is located below lower surfaces 11D of the inner core portions 11 and is substantially flush with the lower surface of the coil 2 when the composite material molded article 10 is assembled in the coil 2.

Inner Core Portion

It is preferable that the inner core portions 11 have a shape corresponding to the shape of the coil 2 (the shape of the inner space of the coil 2). In this specification, the inner core portions 11 have a rectangular parallelepiped shape, and their corners are rounded off to fit the inner peripheral surfaces of the wound portions 2a and 2b. The surfaces of each of the inner core portions 11 are a peripheral surface along the peripheral direction around the magnetic flux as an axis (i.e., a surface along the peripheral direction of the wound portions 2a and 2b), and an interlinkage surface 11E that is an end surface of the inner core portion 11 and intersects the magnetic flux (at a right angle in this specification). In this specification, the peripheral surface of each of the inner core portions 11 includes four flat surfaces, namely the upper surface 11U, the lower surface 11D, a left surface 11L, and a right surface 11R, and four curved surfaces that couple the adjacent flat surfaces. A left-right direction refers to a direction in which the pair of inner core portions 11 is arranged side-by-side when the pair of the inner core portions 11 is viewed from the outer core portion 12 side. The interlinkage surface 11E of the inner core portion 11 is continuous with the peripheral surface.

Outer Core Portion

The outer core portion 12 has a substantially trapezoidal columnar shape. The outer core portion 12 includes the upper surface 12u and the lower surface 12d that are parallel to the magnetic flux, an outer end surface 12o (on a side opposite to the interlinkage surfaces 11E of the inner core portions 11) that connects the upper surface 12u and the lower surface 12d and that is parallel to the magnetic flux, and an inner end surface located on a side opposite to the outer end surface 12o. The inner end surface is located between the inner core portions 11 and is continuous with the inner lateral surfaces of the inner core portions 11. In this specification, the inner end surface is a flat surface that is also continuous with the lower surfaces 11D of the inner core portions 11.

Roughened Region

The roughened region is formed on at least a portion of the surfaces of the composite material molded article 10. The roughened region is a region having an arithmetic average roughness Ra of 3.0 μm or more. Since the roughened region is provided, a favorable anchor effect is obtained. Therefore, the composite material molded article 10 can be used to form the magnetic core 3 having good adhesion (joining properties) to other constituent members containing resin, such as an adhesive and a resin molded portion, which will be described later. The arithmetic average roughness Ra is preferably 4.0 μm or more, more preferably 5.0 μm or more, and particularly preferably 5.5 μm or more. The larger the arithmetic average roughness Ra of the roughened region is, the greater the anchor effect is. There is no particular limitation on the upper limit of the arithmetic average roughness Ra, but the arithmetic average roughness Ra can be set to about 20 μm, for example, from a practical viewpoint.

The roughened region may be formed on at least one of the peripheral surface along the peripheral direction around the magnetic flux as an axis and the interlinkage surface intersecting the magnetic flux (at a right angle in this specification). In a case where the roughened region is formed on the peripheral surface, when the composite material molded article 10 is used in the magnetic core 3, and the reactor 1 is formed by assembling the magnetic core 3 and the coil 2, the adhesion (joining properties) to the other constituent members provided between the outer peripheral surface of the magnetic core 3 and the inner peripheral surface of the coil 2, such as a resin molded portion and sealing resin, which will be described later, can be improved. On the other hand, in a case where the roughened region is formed on the interlinkage surface, the adhesion (joining properties) to the other constituent members that are in contact with the interlinkage surface, such as an adhesive and a resin molded portion, can be improved. This adhesive is used to bond the core members 30 to each other or to bond a gap material provided between the core members 30. The resin molded portion functions as the gap material between the core members 30. In this specification, the roughened region is formed on the entirety of the inner core portions 11, that is, the entireties of the peripheral surfaces and the interlinkage surfaces (indicated by zigzag hatching in FIG. 1). The roughened region is not formed on the outer core portion 12.

Figure 2:
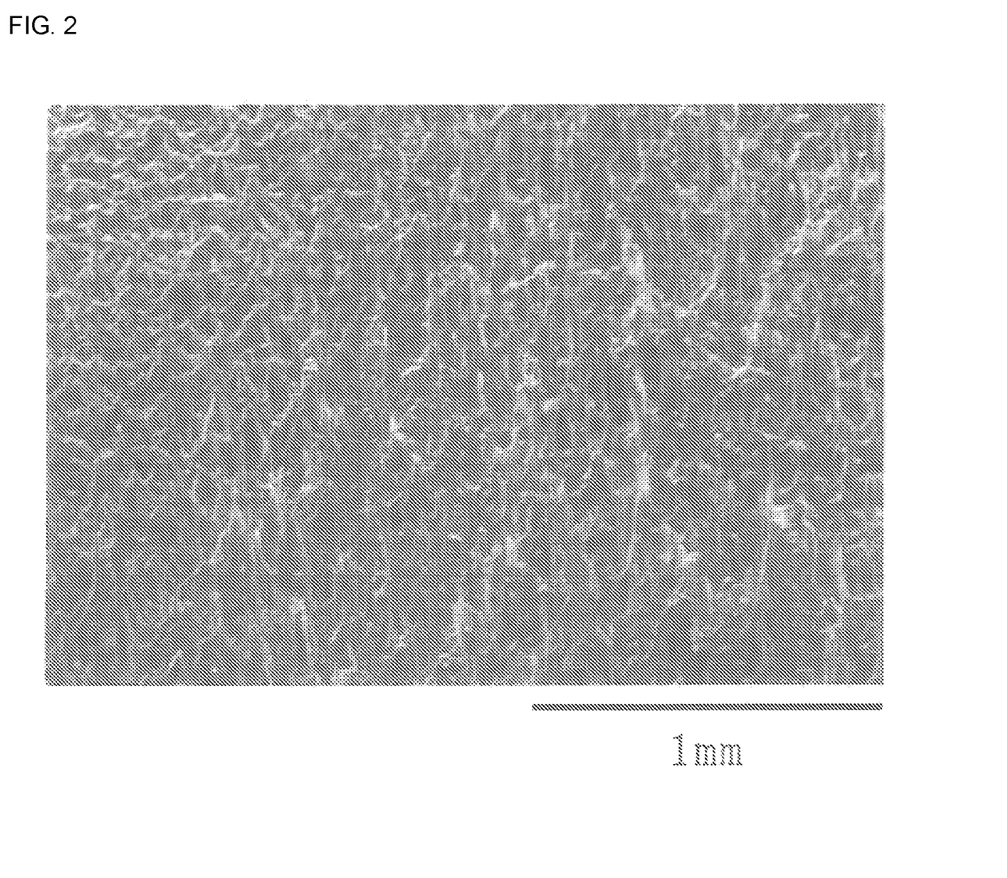
FIG. 2 is a photomicrograph showing an example of a roughened region of a composite material molded article.
Figure 3:
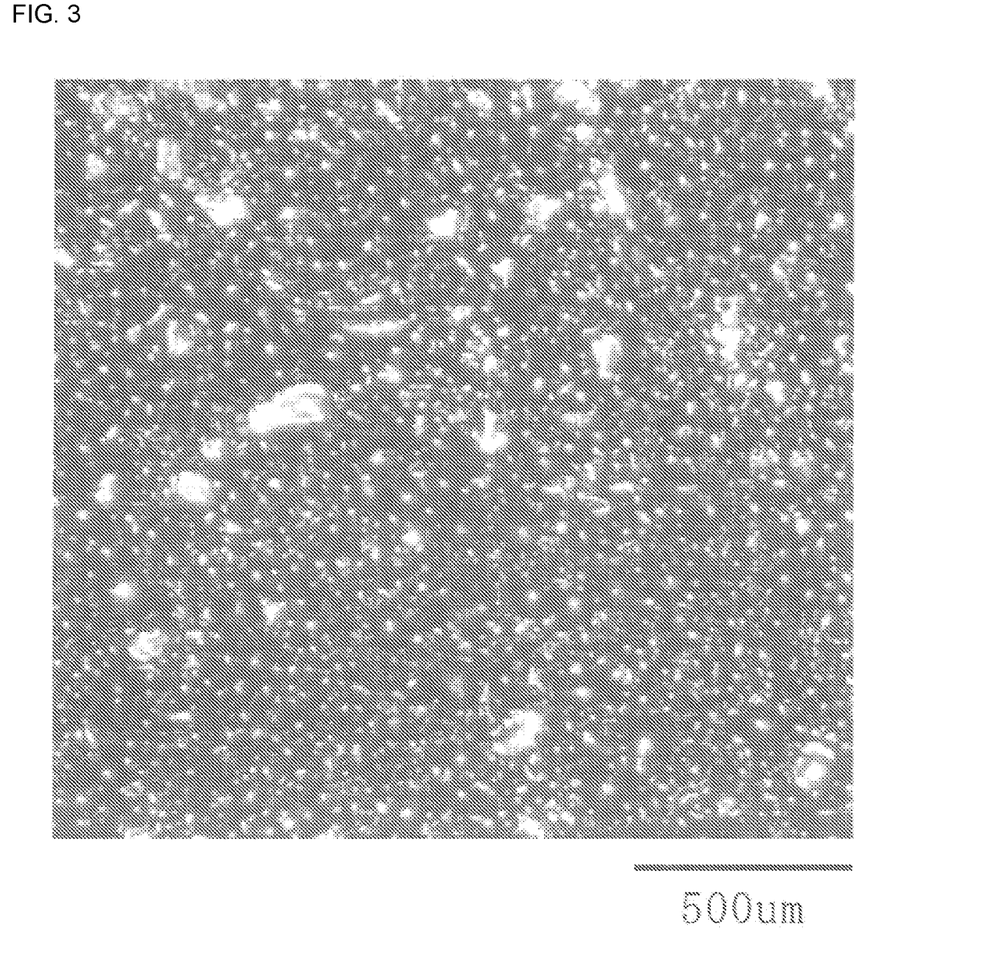
FIG. 3 is a photomicrograph showing another example of a roughened region of a composite material molded article.

Regarding the surface properties of the roughened region, when the roughened region is formed by controlling the temperatures of resin and the mold (details will be described later), for example, innumerable needle-shaped projections that project outward from the surface are continuously formed as shown in FIG. 2. When the roughened region is formed through irradiation with a laser, innumerable hemispherical projections are formed through the aggregation of melted metal due to surface tension as shown in FIG. 3. In contrast, regarding the surface properties of a region in which the roughened region is not formed (i.e., the surfaces of the outer core portion 12 in this specification), although not shown in the figures, the above-mentioned needle-shaped projections and hemispherical projections are not formed, and this region has a substantially flat shape unlike the roughened region.

Constituent Materials

Soft Magnetic Powder

Examples of the materials for the soft magnetic powder include soft magnetic materials such as iron group metals, Fe-based alloys containing Fe as a main component, ferrites, and amorphous metals. It is preferable to use the iron group metals and the Fe-based alloys as the materials for the soft magnetic powder from the viewpoint of eddy current loss and saturation magnetization. Examples of the iron group metals include Fe, Co, and Ni. In particular, Fe is preferably pure iron (containing inevitable impurities). Since Fe has a high saturation magnetization, the saturation magnetization of the composite material can be increased as the Fe content is increased. The Fe-based alloys contain one or more elements selected from Si, Ni, Al, Co, and Cr as additional elements in an amount of 1.0 mass % or more and 20.0 mass % or less in total, and Fe and inevitable impurities as the remainder, for example. Examples of the Fe-based alloys include an Fe—Si based alloy, an Fe—Ni based alloy, an Fe—Al based alloy, an Fe—Co based alloy, an Fe—Cr based alloy, and an Fe—Si—Al based alloy (sendust). In particular, the Fe-based alloys containing Si such as the Fe—Si based alloy and the Fe—Si—Al based alloy have a high electric resistivity, easily reduce eddy current loss, and have a small hysteresis loss, thus making it possible to reduce the iron loss of the composite material molded article 10. When the Fe—Si based alloy is used, for example, the Si content is 1.0 mass % or more and 8.0 mass % or less, and preferably 3.0 mass % or more and 7.0 mass % or less. The soft magnetic powder may be a mixture of a plurality of types of powder made of different materials. An example thereof is a mixture of Fe powder and Fe-based alloy powder.

The soft magnetic powder has an average particle diameter of preferably 5 μm or more and 300 μm or less. When the soft magnetic powder has an average particle diameter of 5 μm or more, the soft magnetic powder is less likely to coagulate, and resin is easily provided sufficiently between the soft magnetic particles, thus making it easy to reduce eddy current loss. When the soft magnetic powder has an average particle diameter of 300 μm or less, eddy current loss of the powder can be reduced since the size is not excessively large, and eddy current loss of the composite material molded article 10 can be thus reduced. In addition, the filling rate can be improved, and the saturation magnetization of the composite material molded article 10 is easily improved. The average particle diameter of the soft magnetic powder is particularly preferably 10 μm or more and 100 μm or less.

The soft magnetic powder may be a mixture of a plurality of types of powder that differ in particle diameter. When soft magnetic powder obtained by mixing fine powder and coarse powder is used as the material for the composite material molded article 10, a low-loss reactor 1 having a high saturation magnetic flux density is easily obtained. When soft magnetic powder obtained by mixing fine powder and coarse powder is used, it is preferable that the soft magnetic powder contains different types of materials, one of which is Fe and the other of which is an Fe-based alloy, for example. When the two types of materials for powder are different, both the characteristics of Fe (high saturation magnetization) and the characteristics of an Fe-based alloy (high electric resistance that facilitates the reduction of eddy current loss) are provided, and the effect of improving saturation magnetization and iron loss are well balanced. When the two types of materials for powder are different, either the coarse powder or the fine powder may be made of Fe (Fe-based alloy), but it is preferable that the fine powder is made of Fe. In other words, it is preferable that the coarse powder is made of an Fe-based alloy. This achieves lower iron loss compared to the case where the fine powder is made of an Fe-based alloy and the coarse powder is made of Fe.

Insulating coatings may be provided on the surfaces (outer peripheries) of the soft magnetic particles in order to improve the insulation. The soft magnetic powder may be subjected to surface treatment (e.g., silane coupling treatment) for improving the compatibility with the resin or the dispersability in the resin.

The content of the soft magnetic powder in the composite material molded article 10 is preferably 30 vol % or more and 80 vol % or less with respect to 100 vol % of the composite material molded article 10. When the content of the soft magnetic powder is 30 vol % or more, the ratio of the magnetic component is sufficiently high. Therefore, when this composite material molded article 10 is used to form the reactor 1, saturation magnetization is easily improved. When the content of the soft magnetic powder is 80 vol % or less, the ratio of the magnetic component is not excessively high, and therefore, the insulation between the soft magnetic particles can be improved, thus making it possible to reduce eddy current loss. Moreover, the mixture of the soft magnetic powder and the resin has a good fluidity, and a good productivity of the composite material molded article 10 is thus achieved. The content of the soft magnetic powder is set to 50 vol % or more, preferably 55 vol % or more, and particularly preferably 60 vol % or more, for example. The content of the soft magnetic powder may be set to 75 vol % or less, and particularly preferably 70 vol % or less, for example.

Resin

Examples of the resin include thermosetting resins such as epoxy resin, phenol resin, silicone resin, and urethane resin, and thermoplastic resins such as polyphenylene sulfide (PPS) resin, polyamide resin (e.g., nylon 6, nylon 66, and nylon 9T), liquid crystal polymers (LCP), polyimide resin, and fluororesin. In addition, cold setting resins, bulk molding compounds (BMCs) obtained by mixing calcium carbonate or glass fiber to unsaturated polyester, millable-type silicone rubber, millable-type urethane rubber, and the like can also be used.

Other Considerations

The composite material molded article 10 may contain powder (filler) made of a non-magnetic material such as ceramic including alumina, silica, and the like in addition to the soft magnetic powder and the resin. The filler contributes to the improvement of a heat dissipating property, and the suppression of uneven distribution of the soft magnetic powder (i.e., uniform dispersion thereof). Moreover, when a fine filler is used and provided between the soft magnetic particles, the reduction of the ratio of the soft magnetic powder due to the filler being contained can be suppressed. The content of the filler is preferably 0.2 mass % or more and 20 mass % or less, more preferably 0.3 mass % or more and 15 mass % or less, and particularly preferably 0.5 mass % or more and 10 mass % or less, with respect to 100 mass % of the composite material.

Application

The composite material molded article 10 can be favorably used for a magnetic core of various magnetic components (e.g., a reactor, a choke coil, a transformer, and a motor), and a material thereof.

Functions and Effects of Composite Material Molded Article

With the above-described composite material molded article 10, the roughened region is provided, and a favorable anchor effect can be thus obtained. Therefore, the adhesion (joining properties) to the other constituent members can be improved. Accordingly, the composite material molded article 10 can be favorably used for the magnetic core 3 of the reactor 1.

Method For Manufacturing Composite Material Molded Article

The composite material molded article 10 can be manufactured using a method for manufacturing a composite material molded article that includes a molding step of injecting an unsolidified mixture (in a fluid state) containing soft magnetic powder and melted resin into a mold and solidifying the resin to mold a composite material molded article. Examples of a method in which a mold is used to produce the material of a molded article include injection molding, heat press molding, or metal injection molding (MIM). The following manufacturing methods I to III can be used as a method for manufacturing a composite material molded article provided with a roughened region.

Manufacturing method I: The above-mentioned molding step is performed in a specific temperature condition.

Manufacturing method II: The above-mentioned molding step is performed using a mold with an inner surface having a specific arithmetic average roughness Ra.

Manufacturing method III: In addition to the above-mentioned molding step, a surface treatment step of performing specific surface treatment on the material of a molded article after the molding step is provided.

Hereinafter, manufacturing methods I to III will be described in this order.

Manufacturing Method I

Molding Step

The molding step of manufacturing method I is performed in a temperature condition that the temperature Tr of the melted resin and the temperature Td of the mold are set to specific temperatures. In this condition, the roughened region having an arithmetic average roughness Ra of 3.0 μm or more is formed on the surface of the material of a molded article, and the composite material molded article 10 is then manufactured.

Temperature Condition

Regarding the temperature condition, the temperature difference (Tr−Td) between the temperature Tr of the melted resin and the temperature Td of the mold can be set to satisfy the condition that "200° C.≤(Tr−Td)", for example. When this temperature difference (Tr−Td) is higher than or equal to 200° C., the composite material molded article 10 provided with the roughened region can be manufactured. The above-mentioned temperature difference preferably satisfies the condition that "(Tr−Td)≤250° C.", more preferably the condition that "(Tr−Td)≤230° C.", and particularly preferably the condition that "(Tr−Td)≤220° C.".

The temperature Td of the mold refers to a temperature of a portion in the mold that corresponds to the roughened region of the composite material molded article 10. Specifically, when the roughened region is formed of a portion of the composite material molded article, the temperature Td of the portion in the mold that corresponds to the roughened region of the composite material molded article 10 is different from the temperature of a portion that corresponds to a region other than the roughened region. The difference between the temperature of a portion that corresponds to a region other than the roughened region and the temperature Tr of the melted resin need not be 200° C. or higher and may be lower than 200° C. In this case, a mold in which the temperature Td of a portion in the mold that corresponds to the roughened region of the composite material molded article 10 and the temperature of a portion that corresponds to a region other than the roughened region can be controlled independently is used as the mold. For example, separate temperature controlling apparatuses are provided for the portion in the mold that corresponds to the roughened region of the composite material molded article 10 and the portion other than this. Examples of the temperature controlling apparatuses include a heater and a heating medium circulating system.

For example, although not shown in the figures, a mold in which a parting surface is located at the border between the outer core portion 12 and the pair of inner core portions 11, and the temperature of a portion in the mold for molding the outer core portion 12 and the temperature of a portion for molding the inner core portions 11 can be controlled independently is used as the mold for manufacturing the above-described composite material molded article 10 that includes the pair of inner core portions 11 and the outer core portion 12 and is provided with the roughened region on the entirety of the inner core portions 11. For example, the portions for forming the core portions 11 and 12 are provided with separate temperature controlling apparatuses. The mold removal direction of this mold extends in the direction in which the outer core portion 12 and the pair of inner core portions 11 are lined up. The temperature Tr of the melted resin and the temperature Td of the portion in the mold for molding the inner core portions 11 are controlled such that the condition that "200° C.≤(Tr−Td)" is satisfied.

Regarding the temperature Td of the mold, depending on the type of the resin, it is preferable that the condition that "Td≤100° C." is satisfied, for example. When Td≤100° C., the temperature Td of the mold is easily lowered, and thus the condition that "200° C.≤(Tr−Td)" is easily satisfied without an excessive rise in the temperature Tr of the resin. The temperature Td of the mold is set to a temperature at which the fluidity does not excessively deteriorate. The reason for this is that the better the fluidity is, the higher the density of the obtained composite material molded article 10 is. It is preferable that the temperature Td of the mold satisfies the condition that "80° C.≤Td".

The relationship between the temperature Td of the mold and the glass transition point Tg of the resin can be selected as appropriate depending on the type of the resin. For example, when PPS resin is used, it is preferable that the condition that "(Tg−10° C.)≤Td≤(Tg+10° C.)" is satisfied. Furthermore, it is preferable that the relationship between the temperature Td of the mold and the glass transition point Tg of the resin satisfies the condition that "Td≤Tg".

For example, when polyamide (nylon) 9T is used, it is preferable that the condition that "(Tg−45° C.)≤Td" is satisfied. It is preferable that the relationship between the temperature Td of the mold and the glass transition point Tg of the resin satisfies the condition that "Td≤Tg" as well as the condition that "Td≤(Tg−25° C.)".

It is preferable that the relationship between the temperature Td of the mold and the melting point Tm of the resin satisfies the condition that "Td≤(Tm−135° C.)". The relationship between the temperature Td of the mold and the melting point Tm of the resin is selected depending on the type of the resin in particular. When PPS resin is used, it is more preferable that the condition that "(Tm−155° C.)≤Td" is satisfied, and when PA9T is used, it is particularly preferable that the condition that "(Tm−175° C.)≤Td≤(Tm−155° C.)" is satisfied.

Functions and Effects of Manufacturing Method I

With manufacturing method I, when the temperatures are controlled based on a specific temperature condition, the composite material molded article 10 provided with the roughened region can be manufactured merely by injecting the mixture into the mold and solidifying the resin. Therefore, although details will be described later, it is not necessary to prepare a mold with an inner surface provided with an uneven region in the same manner as in manufacturing method II and to separately perform the surface treatment step in the same manner as in manufacturing method III. Accordingly, the composite material molded article 10 can be easily manufactured.

Manufacturing Method II

Molding Step

The molding step of manufacturing method II is different from that of manufacturing method I in that a mold provided with an uneven region having a large arithmetic average roughness Ra is used. Specifically, in manufacturing method II, the roughened region having an arithmetic average roughness Ra of 3.0 μm or more is formed on the surface of the material for a molded article by substantially transferring the inner surface (uneven region) of the mold, and the composite material molded article 10 is then manufactured. Therefore, the temperature conditions of the resin and the mold in the molding step are not the above-described specific temperature conditions in manufacturing method I, but normal temperature conditions. For example, the temperature condition can be set such that the condition that "(Tr−Td)≤200° C." is satisfied. The uneven region on the inner surface of the mold can be formed through cutting, grinding, blasting, or the like, for example.

Functions and Effects of Manufacturing Method II

With manufacturing method II, when the mold with the inner surface provided with an uneven region is prepared, the composite material molded article 10 provided with the roughened region can be manufactured merely by injecting the mixture into the mold and solidifying the resin. Therefore, it is not necessary to separately perform the surface treatment step after the molding step in the same manner as in manufacturing method III, which will be described later. Accordingly, the composite material molded article 10 can be easily manufactured.

Manufacturing Method III

Manufacturing method III is different from manufacturing methods I and II in that the surface treatment step of performing specific surface treatment on the surface of the material of a molded article is provided in addition to the molding step of molding the material of a molded article. Specifically, in manufacturing method III, instead of using specific temperature conditions and a specific mold in the same manner as in manufacturing methods I and II, the roughened region having an arithmetic average roughness Ra of 3.0 μm or more is formed on the material of a molded article through the surface treatment step performed after the molding step, and the composite material molded article 10 is then manufactured. Therefore, the temperature conditions of the resin and the mold in the molding step of manufacturing method III are not the above-described specific temperature conditions in manufacturing method I, but the above-described normal temperature conditions in manufacturing method II. Moreover, the arithmetic average roughness Ra of the inner surface of the mold used in this molding step need not be set to a specific magnitude, but can be set to a normal magnitude.

Surface Treatment Step

In the surface treatment step, specific surface treatment is performed on the surface of the material of a molded article obtained through the molding step, and the roughened region is thus formed. Examples of this surface treatment include thermal treatment, optical treatment, mechanical treatment, and composite treatment thereof. Specific examples thereof include laser beam treatment, which is a thermal and optical treatment method, and brushing treatment and blasting treatment, which are mechanical treatment methods.

Laser Beam Treatment

In the laser beam treatment, a predetermined portion of the surface of the material of a molded article is irradiated with a laser beam, and the roughened region is thus formed.

Regarding the type of laser, it is sufficient that a laser with which the arithmetic average roughness Ra of the surface of the material of a molded article can be increased is used. A specific example thereof is a solid-state laser using a solid laser medium. For example, one laser selected from a YAG laser, a YVO4 laser, and a fiber laser is preferable. These lasers encompass known lasers using laser media doped with various materials. In other words, the medium for the above-mentioned YAG laser may be doped with Nd, Er, or the like, the medium for the above-mentioned YVO4 laser may be doped with Nd or the like, and in the above-mentioned fiber laser, the cores of the fibers serving as the media may be doped with a rare-earth element such as Yb.

It is preferable that the wavelength of the laser beam is within a range of wavelengths absorbed by the resin. This makes it possible to form the roughened region having a large arithmetic average roughness Ra. Specifically, the wavelength of the laser beam is preferably about 532 to 1064 nm.

When the average output of the laser beam is taken as P (W), and the irradiation area of the laser beam is taken as S (mm2), the energy density U (W/mm2) of the laser beam is represented by an equation $U=P/S$. It is preferable that the energy density U satisfies the condition that 2 W/mm2≤U≤450 W/mm2. When the energy density U is set to 2 W/mm2 or more, the arithmetic average roughness Ra of the surface of the composite material molded article 10 can be increased sufficiently. On the other hand, when the energy density U is set to 450 W/mm2, contact between the soft magnetic particles due to excessive melting can be suppressed sufficiently. It is particularly preferable that the energy density U (W/mm2) of the laser beam satisfies the condition that 2 W/mm2≤U≤35 W/mm2.

It is preferable that the ratio of an irradiation interval of the laser beam to the diameter of the laser beam is small. The "diameter of a laser beam" refers to as the diameter of the laser beam on the surface of the material of a molded article. The "irradiation interval" refers to a distance between the center of the irradiated laser beam and the center of the laser beam moved in the scanning direction during 1 pulse of laser beam irradiation time. In the case where the ratio of the irradiation interval of the laser beam to the diameter of the laser beam is small, when the surface of the material of a molded article is scanned by the laser beam, an untreated region that is not irradiated with the laser beam can be reduced, thus making it easy to sufficiently increase the arithmetic average roughness Ra of the surface. Specifically, the above-mentioned ratio is preferably 0.35 or less, and particularly preferably 0.30 or less.

Brushing Treatment

In the brushing treatment, a predetermined portion on the surface of the material of a molded article is scraped using a brush, and the roughened region is thus formed. At this time, the surface is scraped by a brush to an extent that the magnetic particles in the composite material molded article 10 are spread and conductive portions are not formed. The type of the brush and the processing conditions (e.g., rotation rate and feed speed) can be selected as appropriate. A commercially available polishing brush or the like can be used as the brush.

Blasting Treatment

In the blasting treatment, a predetermined portion on the surface of the material of a molded article is hit with a blasting material, and the roughened region is thus formed. Examples of the blasting treatment include shot blasting and sand blasting. The size (particle diameter) and type of the blasting material and the blasting conditions can be selected as appropriate.

Functions and Effects of Manufacturing Method III

With manufacturing method III, the surface treatment step is separately performed after the molding step, thus making it possible to manufacture the composite material molded article 10 provided with the roughened region without controlling the temperatures such that the temperature of the resin and the temperature of the mold satisfy a specific relationship, and preparing the mold with the inner surface provided with an uneven region. Moreover, with manufacturing method III, the roughened region can be easily formed in a partial manner compared with manufacturing method I.

Application

These methods I to III for manufacturing a composite material molded article can be favorably used to manufacture the above-mentioned composite material molded article.

Reactor

Figure 1:
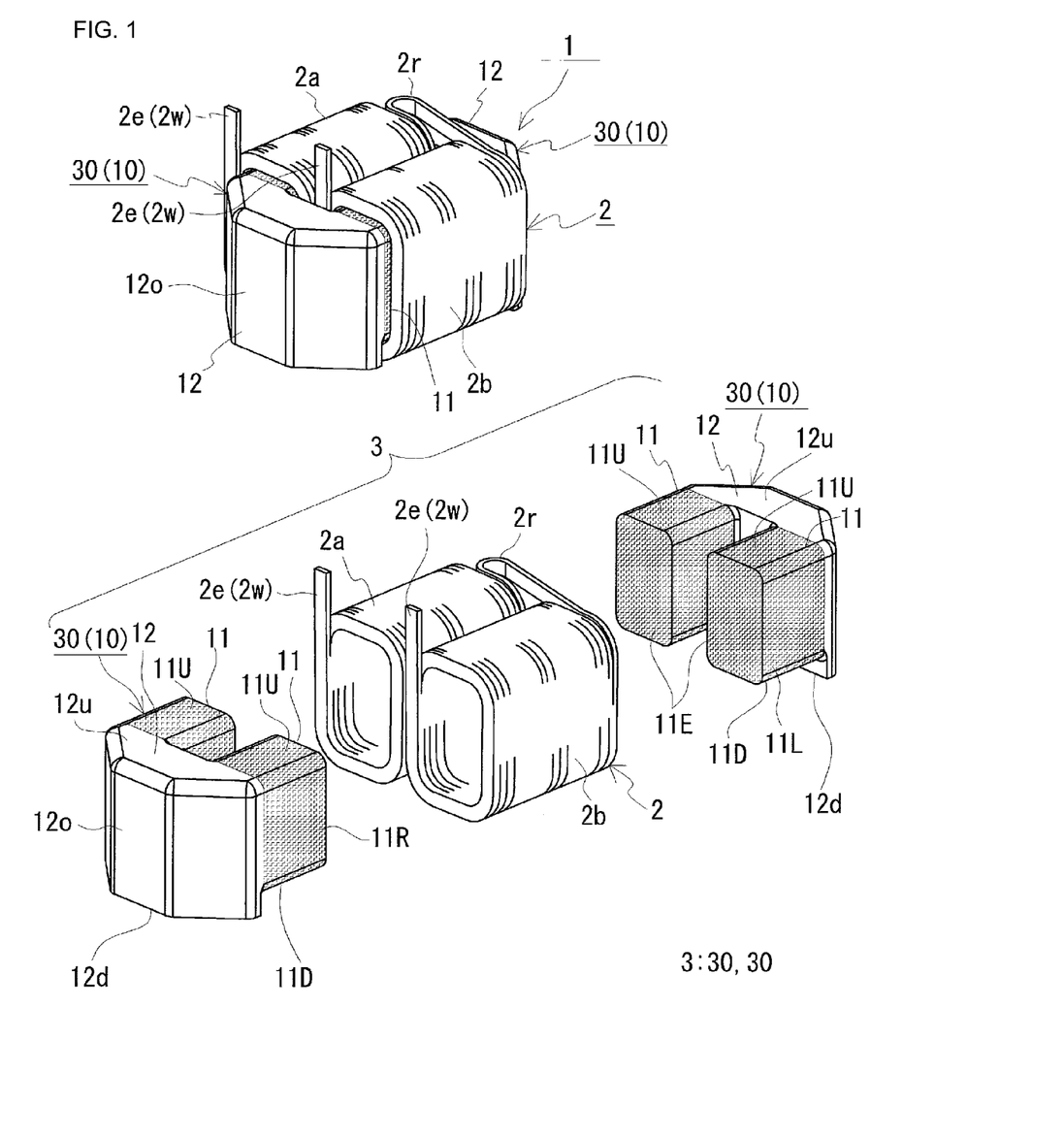
FIG. 1 shows diagrams of a reactor including composite material molded articles according to Embodiment 1. The upper diagram is a schematic perspective view, and the lower diagram is an exploded perspective view.

The above-described composite material molded article 10 can be favorably used in at least a portion of the magnetic core 3 of the reactor 1 as shown in FIG. 1. As described at the beginning of Embodiment 1, the reactor 1 includes the coil 2 including the pair of wound portions 2a and 2b and the magnetic core 3 constituted by the two core members 30 having the same shape. Both the core members 30 are constituted by the above-described composite material molded articles 10.

Coil

The pair of wound portions 2a and 2b are obtained by spirally winding the winding wire 2w, which is a single continuous wire having no joined portions, and are coupled to each other via a coupling portion 2r. A coated flat wire in which a flat wire made of copper is used as a conductor and an insulating coating made of enamel (typically polyamide-imide) is provided on the outer periphery of the conductor can be used as the winding wire 2w. Each of the wound portions 2a and 2b is constituted by an edgewise coil obtained by winding this coated flat wire in an edgewise manner. The wound portions 2a and 2b are arranged in parallel (in a lateral direction) such that their axis directions are parallel to each other. The wound portions 2a and 2b have the same winding number and have a hollow tubular shape (quadrilateral tube). The end surfaces of the wound portions 2a and 2b have a shape obtained by rounding the corners of a rectangular frame. The coupling portion 2r is formed by bending a portion of the winding wire into a U shape at one end of the coil 2 (right side of the plane of FIG. 1). Both end portions 2e of the winding wire 2w of the wound portions 2a and 2b extend from the turn forming portion. Both end portions 2e are connected to terminal members (not shown), and an external apparatus (not shown) such as a power source that supplies power to the coil 2 is connected via these terminal members.

Magnetic Core

The pairs of inner core portions 11 of the respective core members 30 are arranged inside the pair of wound portions 2a and 2b when the core members 30 are assembled in the coil 2. The outer core portions 12 of the core members 30 are arranged protruding from the coil 2 when the core members 30 are assembled in the coil 2 in the same manner. The annular magnetic core 3 is formed by coupling the end surfaces 11E (interlinkage surfaces) of the inner core portions 11 of one of the core members 30 to the end surfaces 11E (interlinkage surfaces) of the inner core portions 11 of the other of the core members 30 inside the wound portions 2a and 2b. With this coupling of the core members 30, when the coil 2 is excited, a closed magnetic circuit is formed, and magnetic fluxes extend parallel to the longitudinal direction of the inner core portions 11 and intersect the interlinkage surfaces at a right angle.

An insulating adhesive can be used to couple the core members 30 to each other. Favorable examples of the insulating adhesive include thermosetting adhesives such as epoxy resin and silicone resin, thermoplastic adhesives such as PPS resin, and acrylate-based ultraviolet-curable (photocurable) adhesives. Since the interlinkage surfaces 11E of the core members 30 are provided with the roughened region, the adhesion (joining properties) of the adhesive to the core members 30 can be improved. Accordingly, vibration and noise caused by the separation of the adhesive from the core members 30 can be suppressed.

Gap materials may be provided between the core members 30, that is, between the interlinkage surfaces of the inner core portions 11. Examples of the material of the gap material include materials having a magnetic permeability lower than those of the core members 30, including non-magnetic materials such as alumina, and mixtures containing a non-magnetic material such as PPS resin and a magnetic material (e.g., iron powder). The core members 30 and the gap materials may be bonded using the above-mentioned adhesive. Gaps (air gaps) may be provided between the core members 30.

Other Constituent Members

Resin Molded Portion

The magnetic core 3 further includes a resin molded portion (not shown) that covers the surfaces of the core member 30. The entire region of the surfaces of the core member 30 can be covered with the resin molded portion, for example. When the peripheral surface and the interlinkage surface 11E of the inner core portion 11 are provided with the roughened region, the adhesion (joining properties) of the resin molded portion to the peripheral surface and the interlinkage surface 11E can be improved. Examples of the constituent material of the resin molded portion include the same thermoplastic resins (e.g., PPS resin) and thermosetting resins as the resin of the above-described composite material molded article 10. These constituent resins may contain a ceramic filler such as alumina and silica. This provides a good thermal conductivity to the resin molded portion, and the heat dissipation properties of the reactor 1 can be thus improved.

Case and Sealing Resin Portion

The reactor 1 may further include a case (not shown) in which an assembly of the coil 2 and the magnetic core 3 is accommodated, and a sealing resin portion (not shown) with which the case is filled and that seals the assembly accommodated in the case. In this case, the magnetic core 3 need not include the resin molded portion.

The case includes a base plate on which the assembly is mounted and that is installed on an installation target (not shown) such as a cooling base, and a lateral wall that is provided upright from the peripheral edge of the base plate and surrounds the assembly. It is preferable to use a metal such as aluminum or an alloy thereof as the material of the case. Since this metal has a relatively high thermal conductivity, its entirety can be used as a heat dissipating path. Therefore, heat generated in the assembly can be efficiently dissipated to the installation target, thus making it possible to improve the heat dissipating property of the reactor 1.

The sealing resin portion may be formed in a region spanning from the upper surface of the base plate to the height at which the upper surface of the coil 2 is embedded. The sealing resin portion is provided between the peripheral surfaces of the inner core portions 11 and the inner peripheral surfaces of the coil 2. When air gaps are provided between the core members 30 (i.e., between the interlinkage surfaces 11E of the inner core portions 11), the sealing resin portion is provided between the core members 30. Since the peripheral surfaces and the interlinkage surfaces 11E of the inner core portions 11 are provided with the roughened region, the adhesion between the peripheral surfaces of the inner core portions 11 and the sealing resin portion and the adhesion between the interlinkage surfaces 11E of the inner core portions 11 and the sealing resin portion can be improved. Examples of the constituent resin of the sealing resin portion include insulating resins such as epoxy resin and silicone resin. Similarly to the resin molded portion, adding a filler to the constituent resin of the sealing resin portion makes it possible to improve the heat dissipation property.

Bonding Layer

The reactor 1 may further include bonding layers (not shown) that are provided between the inner peripheral surfaces of the coil 2 and the peripheral surfaces of the inner core portions 11 and bond the coil 2 and the inner core portions 11. Since the peripheral surfaces of the inner core portions 11 are provided with the roughened region, the adhesion between the peripheral surfaces of the inner core portions 11 and the bonding layers can be improved.

Application

The reactor 1 can be favorably used in constituent components of various types of converters such as vehicle-mounted converters (typically DC-DC converters) to be mounted in vehicles including hybrid cars, plug-in hybrid cars, electric cars, fuel cell cars, and the like, and converters for an air conditioner, and constituent components of power conversion devices.

Functions and Effects of Reactor

With the above-described reactor 1, good adhesion (joining properties) between the magnetic core 3 and the other constituent members such as the adhesive, the resin molded portion, the sealing resin portion, and the bonding layer is achieved. Therefore, good insulation between the coil 2 and the magnetic core 3 is achieved in the reactor 1, and vibration and noise caused by the separation of the other constituent members from the magnetic core 3 is suppressed.

TEST EXAMPLES

Samples of composite material molded articles including soft magnetic powder and resin containing the soft magnetic powder in a dispersed state were prepared, and the adhesion of the samples was evaluated.

Samples No. 1-1 to No. 1-7

As composite material molded articles of Samples No. 1-1 to No. 1-7, the composite material molded article 10 shown in FIG. 1 was produced through a raw material preparation step and the molding step.

Raw Material Preparation Step

In the raw material preparation step, a mixture of soft magnetic powder and resin was prepared. Fe—Si alloy powder having an average particle diameter of 80 μm and containing Si in an amount of 6.5 mass % and Fe and inevitable impurities as the remainder was used as the soft magnetic powder. PPS resin (glass transition point Tg=90° C., melting point Tm=235° C.) or PAST resin (glass transition point Tg=125° C., melting point Tm=255° C.) was used as the resin. The soft magnetic powder and the resin were mixed, and then the resin was melted. In this state, the resin and the soft magnetic powder were kneaded together to produce a mixture. The content of the soft magnetic powder in the mixture was set to 70 vol %.

Molding Step

In the molding step, a U-shaped composite material molded article 10 including a pair of inner core portions 11 and an outer core portion 12 was produced through injection molding. A mold in which a parting surface is located at the border between the outer core portion 12 and the pair of inner core portions 11 was used and was filled with the above-mentioned mixture, and then the mixture was cooled and solidified. The composite material molded article 10 was thus produced. That is, the mold removal direction extended in the direction in which the outer core portion 12 and the pair of inner core portions 11 are lined up. This mold was provided with a temperature controlling apparatus that can independently control the temperature of a portion in the mold for molding the outer core portion 12 and the temperature of a portion for molding the inner core portions 11. In this specification, the temperature Tr of melted resin in the mixture and the temperature Td of the portion in the mold for molding the inner core portions 11 were varied as shown in Table 1. The temperature of the portion in the mold for molding the outer core portion 12 was set to 130° C.

Measurement of Surface Roughness

Regarding the outer core portions and the inner core portions of the composite material molded articles of the samples, the arithmetic average roughness Ra (μm) was measured using a commercially available surface roughness measurement apparatus in accordance with JIS B 0601 (2013). Measurement of the arithmetic average roughness Ra was performed on the lower surfaces for both core portions. Table 1 shows the results.

Measurement of Density

Regarding the composite material molded articles of the samples, the density (g/cm3) was measured. Table 1 shows the results. The apparent densities Da calculated from the size and the mass were taken as the densities of the composite material molded articles of the samples. Moreover, ΔD, which is a difference between a density Di (5.62 g/cm3 in this specification) of the composite material molded article in an ideal state and the apparent density Da of each of the samples, was calculated, and the ratio of the density difference ΔD to the density Di, namely "(ΔD/Di)×100", was calculated. The case where this ratio was 0.6% or less (the difference was 0.035 g/cm3 or less) was evaluated as "Good", and the case where this ratio was more than 0.6% (the difference was more than 0.035 g/cm3) was evaluated as "Bad". The density Di of the composite material molded article in an ideal state was a value calculated using the average particle diameter of the soft magnetic powder, the content of the soft magnetic powder in the mixture, and the size of the composite material molded article.

Evaluation of Adhesion

The adhesion of each sample to the other member was evaluated. Measurement samples in which bonding layers made of epoxy resin were bonded to the lower surfaces of the inner core portions of the composite material molded articles of the samples were produced, and the bonding states of the bonding layers were visually confirmed after a thermal shock test. The adhesion was thus evaluated. In the thermal shock test, "room temperature→140° C. for 1 hour→−40° C. for 1 hour" was taken as one cycle of a cooling-heating cycle, and 500 cycles of the cooling-heating cycle were performed on the measurement samples. The case where separation was not observed was evaluated as "Good", and the case where separation was observed was evaluated as "Bad". Table 1 shows the results.

TABLE 1

| Sample No. | Soft magnetic powder | Resin Type | Tg (° C.) | Tm (° C.) | Molding step Td (° C.) | Tr (° C.) | Arithmetic average roughness Ra (μm) Outer core portion | Arithmetic average roughness Ra (μm) Inner core portion | Density (g/cm³) | Adhesion |
|---|---|---|---|---|---|---|---|---|---|---|
| 1-1 | Fe—6.5Si | PPS | 90 | 235 | 130 | 300 | 0.5 | 0.4 | 5.56 | Bad Bad |
| 1-2 | Fe—6.5Si | PPS | 90 | 235 | 110 | 300 | 0.5 | 0.7 | 5.58 | Bad Bad |
| 1-3 | Fe—6.5Si | PPS | 90 | 235 | 100 | 300 | 0.6 | 0.3 | 5.59 | Bad Good |
| 1-4 | Fe—6.5Si | PPS | 90 | 235 | 80 | 300 | 0.6 | 0.9 | 5.60 | Good Good |
| 1-5 | Fe—6.5Si | PPS | 90 | 235 | 80 | 280 | 0.7 | 0.2 | 5.60 | Good Good |
| 1-6 | Fe—6.5Si | PA9T | 125 | 235 | 130 | 300 | 0.5 | 0.4 | 5.56 | Bad Bad |
| 1-7 | Fe—6.5Si | PA9T | 125 | 235 | 80 | 300 | 0.5 | 0.4 | 5.61 | Good Good |

As shown in Table 1, in Samples No. 1-3 to No. 1-5, and No. 1-7 in which the difference (Tr–Td) between the temperature Tr of the melted resin and the temperature Td of the mold satisfied the condition that "200° C.≤(Tr–Td)", the roughened region having an arithmetic average roughness Ra of 3.0 μm or more was formed on the surfaces. On the other hand, in Samples No. 1-1, No. 1-2, and No. 1-6 in which the above-mentioned difference (Tr–Td) satisfied the condition that "(Tr–Td)≤200° C.", the arithmetic average roughness of the surfaces was 1.7 μm or less, and the roughened surface was not formed. It was found that Samples No. 1-3 to No. 1-5, and No. 1-7 having an arithmetic average roughness Ra of 3.0 μm or more had a good adhesion, and Samples No. 1-1, No. 1-2, and No. 1-6 having an arithmetic average roughness Ra of less than 3.0 μm had a poor adhesion. In particular, it was found that Samples No. 1-4, No. 1-5, and No. 1-7 that satisfied the condition that "200° C.≤(Tr–Td)", "Td≤100° C.", or "Tr≤300° C." in the molding step had a high adhesion as well as a high density.

The present description is not limited to these embodiments and is defined by the scope of the appended claims, and all changes that fall within the same essential spirit as the scope of the claims are intended to be included therein. For example, the shape of the core member can be selected as appropriate depending on the combinations of a plurality of core members in a magnetic core. A plurality of core members can be combined to form a so-called L-L (J-J) type core in which one inner core portion is integral with the outer core portion, other than the above-described U-U type core. Moreover, a reactor including a coil with a single wound portion and a magnetic core called an E-E type core or an E-I type core can also be formed.

LIST OF REFERENCE NUMERALS

10 Composite material molded article
11 Inner core portion
11U Upper surface 11D Lower surface 11L Left surface 11R Right surface
11E Interlinkage surface (end surface)
12 Outer core portion
12u Upper surface 12d Lower surface
12o Outer end surface
1 Reactor
2 Coil
2a, 2b Wound portion 2r Coupling portion 2w Winding wire 2e End portion
3 Magnetic core
30 Core member

The invention claimed is:

1. A composite material molded article comprising:
a soft magnetic powder; and
a resin containing the soft magnetic powder in a dispersed state; and
an interlinkage surface, the interlinkage surface is a surface that intersects a magnetic flux excited in the composite material molded article among surfaces of the composite material molded article; and
wherein a roughened region has an arithmetic average roughness Ra of 4.4 μm or more and has such surface properties defined by innumerable needle-shaped projections projecting outward from a surface of the roughened region, and wherein the innumerable needle-shaped projections are only formed on the interlinkage surface.

2. The composite material molded article according to claim 1, wherein the soft magnetic powder contains soft magnetic particles made of an Fe-based alloy that contains Si in an amount of 1.0 mass % or more and 8.0 mass % or less.

3. The composite material molded article according to claim 1, wherein the soft magnetic powder is contained in the composite material molded article in an amount of 30 vol % or more and 80 vol % or less with respect to the entirety of the composite material molded article.

4. The composite material molded article according to claim 1, wherein the soft magnetic powder has an average particle diameter of 5 μm or more and 300 μm or less.

5. A reactor comprising:
a coil obtained by winding a winding wire; and
a magnetic core around which the coil is arranged, wherein at least a portion of the magnetic core includes the composite material molded article according to claim 1.

6. A composite material molded article comprising:
a pair of inner core portions each having:
a soft magnetic powder; a resin containing the soft magnetic powder in a dispersed state; and
an interlinkage surface, the interlinkage surface being a surface that intersects a magnetic flux excited in the composite material molded article among surfaces of the composite material molded article; and
a roughened region having an arithmetic average roughness Ra of 4.4 μm or more and has such surface properties defined by innumerable needle-shaped projections projecting outward from a surface of the roughened region, and wherein the innumerable needle-shaped projections are only formed on the interlinkage surface;

wherein each of the interlinkage surfaces are joined to each other by an adhesive.

7. A composite material molded article comprising:
soft magnetic powder; and resin containing the soft magnetic powder in a dispersed state, and
a peripheral surface includes surfaces along a circumferential direction of a magnetic flux excited in the composite material molded article among surfaces of the composite material molded article, and
the roughened region is formed only on the peripheral surface.

8. The composite material molded article according to claim 7, wherein the soft magnetic powder contains soft magnetic particles made of an Fe-based alloy that contains Si in an amount of 1.0 mass % or more and 8.0 mass % or less.

9. The composite material molded article according to claim 7, wherein the soft magnetic powder is contained in the composite material molded article in an amount of 30 vol % or more and 80 vol % or less with respect to the entirety of the composite material molded article.

10. The composite material molded article according to claim 7, wherein the soft magnetic powder has an average particle diameter of 5 μm or more and 300 μm or less.

* * * * *